United States Patent

[11] 3,625,836

| [72] | Inventors | Harry A. Stansbury, Jr.<br>South Charleston;<br>Harry J. Decker, Charleston, both of W. Va. |
|---|---|---|
| [21] | Appl. No. | 843,790 |
| [22] | Filed | July 22, 1969 |
| [45] | Patented | Dec. 7, 1971 |
| [73] | Assignee | Union Carbide Corporation<br>New York, N.Y. |

[54] PURIFICATION OF ALKOXYACETONE FROM 1-ALKOXY-2-PROPANOL BY AZEOTROPIC DISTILLATION WITH WATER
6 Claims, No Drawings

[52] U.S. Cl. ..................................................... 203/83,
203/85, 203/76, 203/95, 260/594, 260/615
[51] Int. Cl. ........................................................ B01d 3/36,
B01d 3/38
[50] Field of Search............................................ 203/92, 95,
62, 63, 76, 78, 79, 81, 83, 85, 96, 97, 98, 99;
260/586, 590, 594, 616, 680

[56] References Cited
UNITED STATES PATENTS

| 2,170,855 | 8/1939 | Chitwood..................... | 260/594 |
|---|---|---|---|
| 2,670,324 | 2/1954 | Grekel et al. ................ | 203/96 |
| 2,805,983 | 9/1957 | Horsley ....................... | 203/63 X |
| 2,862,853 | 12/1958 | Luke et al..................... | 203/96 X |
| 3,214,347 | 10/1965 | Grekel et al. ................ | 203/63 |
| 3,287,235 | 11/1966 | Statman ...................... | 203/55 |
| 3,303,108 | 2/1967 | Rauch et al................... | 203/96 |
| 3,528,891 | 9/1970 | Rauch et al................... | 203/96 |

FOREIGN PATENTS

| 1,002,656 | 8/1965 | Great Britain............... | 203/96 |

*Primary Examiner*—Norman Yudkoff
*Assistant Examiner*—David Edwards
*Attorneys*—Paul A. Rose and Louis C. Smith, Jr.

ABSTRACT: A method for recovering alkoxyacetones from mixtures of alkoxyacetone and the corresponding 1-alkoxy-2-propanol by adding water to the mixture and distilling to form a lower boiling alkoxyacetone-water azeotrope.

PURIFICATION OF ALKOXYACETONE FROM 1-ALKOXY-2-PROPANOL BY AZEOTROPIC DISTILLATION WITH WATER

This invention relates to the recovery of alkoxyacetones.

The most common form of preparation of alkoxyacetones is to catalytically dehydrogenate 1-alkoxy-2-propanols while in the vapor phase. When such a method is used, problems of separation arise due to the formation of an azeotrope between the newly formed alkoxyacetone and the starting material, a 1-alkoxy-2-propanol, if recovery by distillation is employed.

This difficulty has been noted in the past and a variety of solutions have been proposed in an attempt to effect a high degree of recovery of the alkoxyacetone. In U.S. Pat. No. 2,170,855, an organic acid or anhydride is added to a reaction mixture of alkoxyacetone and 1-alkoxy-2-propanol in order to form a higher boiling ester with the 1-alkoxy-2-propanol starting material. The resulting mixture is distilled and then redistilled to recover the desired alkoxyacetone. A method for separation of alkoxyacetones from a mixture of alkoxyacetone and the corresponding 1-alkoxy-2-propanol is described in U.S. Pat. No. 2,805,983 wherein an unsubstituted monohydric alcohol is added to the reaction mixture in order to separate the azeotropic combination. In this process, a new azeotrope is formed between the unsubstituted monohydric alcohol and the alkoxyacetone and the alkoxyacetone is recovered from the newly formed lower boiling azeotrope.

It is an object of the invention to provide an effective separation of alkoxyacetone from a mixture of alkoxyacetone and the corresponding 1-alkoxy-2-propanol.

It is another object of the invention to provide a commercially practicable method of separating alkoxyacetone from a mixture of alkoxyacetone and the corresponding 1-alkoxy-2-propanol.

It is yet another object of this invention to obtain a maximum recovery of alkoxyacetone from a mixture of alkoxyacetone and the corresponding 1-alkoxy-2-propanol.

It is another object of this invention to provide a method for the effective recovery of 1-alkoxy-2-propanol from a mixture of 1-alkoxy-2-propanol and the corresponding alkoxyacetone.

It is still another object of this invention to provide a method for the separation of alkoxyacetone and the corresponding 1-alkoxy-2-propanol involving a minimum of equipment fouling and energy expenditure.

These and other objects will become obvious by the following description of the invention.

It has now been found that alkoxyacetone can be separated from a mixture of alkoxyacetone and the corresponding 1-alkoxy-2-propanol by the addition of water to the mixture which forms an azeotrope with alkoxyacetone at a temperature around 93° C. and contains from about 60 to about 70 percent alkoxyacetone and from about 40 to about 30 percent water. The alkoxyacetone can then be recovered in high purity from the newly formed azeotrope containing water by conventional recovery procedures such as a further azeotropic distillation with benzene.

The alkoxyacetones contemplated for use in the instant invention are the lower alkoxyacetones having from 1 to 4 carbon atoms in the lower alkoxy group. Typical lower alkoxyacetones are methoxyacetone, ethoxyacetone, n-propoxyacetone, isopropoxyacetone, and n-butoxyacetone.

Alkoxyacetones have a variety of uses including as a coatings solvent for vinyl resins such as copolymers of vinyl chloride and vinyl acetate, terpolymers of vinyl chloride, vinyl acetate, and vinyl alcohol or maleic acid; nitrocellulose, cellulose acetate, and cellulose acetate butyrate.

Water is added to the mixture of alkoxyacetone and the corresponding 1-alkoxy-2-propanol in amounts from about 10 or lower to about 90 weight percent, or higher based upon the amount of alkoxyacetone present in the reaction mixture, with a range of about 25 to about 55 weight percent preferred. A particularly preferred range is from about 37 to about 45 weight percent, based upon the amount of alkoxyacetone present in the reaction mixture. Using less than 10 weight percent will cause less than 25 percent of the alkoxyacetone to azeotropically distill with the water which would be characterized by inefficiency and high costs. The addition of more than 90 weight percent water will produce a mixture of 1-alkoxy-2-propanol and water, wherein water is present in a predominant amount, which would severely interfere with any recycle of the 1-alkoxy-2-propanol.

Pressure does not appear to be critical and pressures, above and below atmospheric pressure, as well as atmospheric pressure can be used during the recovery operation. It would be expected that a slight change in the composition of the azeotropic mixtures would occur, but the process would be fundamentally the same at different pressures.

Separation of the alkoxyacetone from the alkoxyacetone-water azeotrope can be performed by a variety of methods with azeotropic distillation of water with benzene being preferred, due to its economy. In this procedure, the benzene-water azeotrope is utilized for at atmospheric pressure, the boiling point of the azeotrope, containing 91.9 weight percent benzene and 8.9 weight percent water, is 69.4° C., and at 20° C., the mixture contains 99.93 weight percent water in the lower layer and 99.94 weight percent benzene in the upper layer. Thus, this method does not require the use of sophisticated equipment or extreme conditions to be highly effective for water removal.

The separation can be run in either a continuous, semicontinuous, or batchwise manner and on conventional distillation equipment. The equipment can be glass, steel, glass-lined kettles or any of the well-known columns and other apparatus used in distillation. If a continuous or semicontinuous operation is performed, it can be either crosscurrent, cocurrent, or countercurrent.

The following examples are illustrative.

EXAMPLE 1

A mixture containing 247 grams of methoxyacetone, 55 grams of water, and 53 grams of 1-methoxy-2-propanol was charged to a 500 milliliter flask. The mixture was subjected to distillation through a column having approximately 24 theoretical plates at a head temperature of 93° C. until 151 grams of distillate was removed at a reflux ratio of 10 to one. At this point, an analysis by gas chromotography of the remaining kettle charge indicated that it contained 140 grams of methoxyacetone and 53 grams of 1-methoxy-2-propanol, which was identical for the latter to the amount of the original charge. Thus, the distillate contained only water and methoxyacetone, in amounts of 29 percent and 71 percent respectively. This is equivalent to 41 grams of water per 100 grams of methoxyacetone or 41 percent, based upon the weight of methoxyacetone.

EXAMPLE 2

A 1.0 liter flask was charged with 500 grams of product resulting from the catalytic vapor phase dehydrogenation of 1-methoxy-2-propanol which contained 340 grams of methoxyacetone, 149 grams of 1-methoxy-2-propanol and 11 grams of unidentified byproducts of the reaction, most likely condensation products of methoxyacetone. Water was added to the flask in an amount of 150 grams (representing 44 weight percent of methoxyacetone). A column having approximately 24 theoretical plates was again used to distill the mixture at atmospheric pressure. The head temperature rose to 93° C. after 15 grams of low-boiling byproducts were removed. Then 466 grams of the methoxyacetone-water azeotrope were distilled off to a head temperature of 96° C. Analysis of the remaining kettle charge by gas chromotography indicated the presence of 10 grams of methoxyacetone, approximately 150 grams of 1-methoxy-2-propanol and six grams of high boiling byproducts.

The total azeotropic mixture of methoxyacetone and water (466 grams) and 256 grams of benzene were charged to a one liter flask. Water was removed by an azeotropic distillation with benzene through a still equipped with a decanting head. After water was decanted, the benzene was distilled off. A 20 gram midfraction removed to a head temperature of 114° C. contained 9 grams of benzene and 11 grams of methoxyacetone. The kettle product, at the same time, was found to contain 304 grams of 98 percent methoxyacetone.

After distillation the methoxyacetone obtained by this technique had a purity of 99 percent. The purity and structure of the ketone was confirmed by infrared analysis.

EXAMPLE 3

A crude mixture obtained from the vapor phase catalytic dehydrogenation of 1-ethoxy-2-propanol containing 12 grams of low-boiling byproducts, 204 grams of ethoxyacetone, 76 grams of 1-ethoxy-2-propanol and 7 grams of high-boiling byproducts, was charged along with 31 grams of water to a 500 milliliter distilling flask, and distilled through a column having approximately 24 theoretical plates. The head temperature rose to 92° C. after 10 grams of low-boiling byproducts were distilled. An 83 gram fraction was then distilled off to a head temperature of 95° C. The undistilled material remaining in the kettle was analyzed by gas chromatography and found to contain 149 grams of ethoxyacetone and 75 grams of 1-ethoxy-2-propanol. Approximately 55 grams of ethoxyacetone had been azeotropically removed with water. Since the kettle temperature had risen to 133° C. during this distillation, indicating that most of the water had been removed from the kettle, an additional 70 grams of water was added in order to recover ethoxyacetone further. Distillation was continued and 180 grams of distillate was removed at a head temperature of 92° to 94° C. while the kettle temperature rose from 100° to 137° C. The remaining undistilled material contained 35 grams of 1-ethoxy-2-propanol. A total of 169 grams of ethoxyacetone was removed as an azeotropic mixture along with about 100 grams of water. The azeotrope was found to contain about 38 percent water and 62 percent ethoxyacetone by chromatographic analysis. This is equivalent to about 62 grams of water per 100 grams of ethoxyacetone.

EXAMPLE 4

Crude product from the catalytic dehydrogenation of 1-ethoxy-2-propanol comprising 50 grams of low-boiling byproducts, 900 grams of ethoxyacetone, 336 grams of 1-ethoxy-2-propanol, and 20 grams of high-boiling byproducts was charged to a 3 liter flask along with 554 grams of water, equivalent to 61.5 weight percent of the ethoxyacetone present. This mixture was distilled in a column having approximately 24 theoretical plates at atmospheric pressure. The head temperature rose to 92° C. after 46 grams of low-boiling byproducts were removed. Then 1,449 grams of the ethoxyacetone-water azeotrope was distilled off to a head temperature of 95° C. Analysis of the undistilled material by gas chromotography disclosed a mixture of 10 grams of ethoxyacetone, 332 grams of 1-ethoxy-2-propanol and 20 grams of high-boiling byproducts. The azeotrope had thus been able to remove 98.8 percent, (890 grams) of the ethoxyacetone from the mixture of ethoxyacetone and 1-ethoxy-2-propanol. The azeotrope contained 58 percent ethoxyacetone and 41 percent water as determined by chromatographic analysis. A 1,276 gram portion of the ethoxyacetone-water azeotrope and 400 grams of benzene were charged to a still equipped with a decanting head and distilled. After removal of 490 grams of the lower layer, which was predominantly water, at a head temperature of 67° C. to 79° C., a standard conventional still head was installed in place of the decanting head. Benzene plus midcuts were then distilled off to a head temperature of 127° C. At a head temperature of 127° to 128° C., 94.3 percent of the ethoxyacetone contained in the charge was recovered in 98 percent purity. The remaining 5.7 percent of the ethoxyacetone was retained by the midcuts and the still column holdup. The purified ethoxyacetone had the following physical properties: specific gravity, 0.902 at 30° C. and boiling point at atmospheric pressure, 128° C.

Although the examples were limited to the separation of methoxyacetone and ethoxyacetone from mixtures comprising the alkoxyacetones and the corresponding, 1-alkoxy-2-propanols, it is obvious that the same process can be readily employed for propoxyacetone and butoxyacetone.

What is claimed is:

1. A method for the separation of a lower alkoxyacetone from a mixture of the lower alkoxyacetone and the corresponding 1-lower alkoxy-2-propanol which comprises
   a. contacting the mixture with water in an amount of from about 10 percent to about 90 percent, based upon the weight of the lower alkoxyacetone present in the mixture,
   b. azeotropically distilling the resulting mixture, and
   c. recovering the azeotrope fraction containing the lower alkoxyacetone and water 2. The method according to claim 1 wherein said lower alkoxyacetone is methoxyacetone.

3. The method according to claim 1 wherein said lower alkoxyacetone is ethoxyacetone.

4. A method for the separation of a lower alkoxyacetone from a mixture of the lower alkoxyacetone and the corresponding 1-lower alkoxy-2-propanol which comprises
   a. contacting the mixture with water in an amount of from about 10 percent to about 90 percent, based upon the weight of the lower alkoxyacetone present in the mixture,
   b. azeotropically distilling the resultant mixture,
   c. recovering the azeotrope fraction containing the lower alkoxyacetone and water, and
   d. subjecting the fraction to further distillation to recover the lower alkoxyacetone.

5. The process according to claim 4 wherein said lower alkoxyacetone is methoxyacetone.

6. The process according to claim 4 wherein said lower alkoxyacetone is ethoxyacetone.

* * * * *